(12) United States Patent
Grand

(10) Patent No.: US 12,502,814 B2
(45) Date of Patent: Dec. 23, 2025

(54) CHAMBER FOR STEAM MOULDING OF EXPANDED OR CELLULAR MATERIALS OR FOAMS

(71) Applicant: KNAUF INDUSTRIES GESTION, Wolfgantzen (FR)

(72) Inventor: Fabrice Grand, Wolfgantzen (FR)

(73) Assignee: KNAUF INDUSTRIES GESTION, Wolfgantzen (FR)

( * ) Notice: Subject to any disclaimer, the term of this patent is extended or adjusted under 35 U.S.C. 154(b) by 100 days.

(21) Appl. No.: 18/373,077

(22) Filed: Sep. 26, 2023

(65) Prior Publication Data

US 2024/0123658 A1 Apr. 18, 2024

(30) Foreign Application Priority Data

Sep. 27, 2022 (FR) .................................... 2209768
Apr. 4, 2023 (FR) .................................... 2303342

(51) Int. Cl.
| | |
|---|---|
| *B29C 44/34* | (2006.01) |
| *B29C 33/56* | (2006.01) |
| *B29C 44/58* | (2006.01) |
| *B29K 105/04* | (2006.01) |

(52) U.S. Cl.
CPC .......... *B29C 44/3426* (2013.01); *B29C 33/56* (2013.01); *B29C 44/3403* (2013.01); *B29C 44/3461* (2013.01); *B29C 44/58* (2013.01); *B29K 2105/048* (2013.01); *B29K 2905/02* (2013.01); *B29K 2905/10* (2013.01); *B29K 2905/12* (2013.01); *B29K 2995/0013* (2013.01); *B29K 2995/0015* (2013.01)

(58) Field of Classification Search
CPC ............ B29C 44/3426; B29C 44/3403; B29C 33/3828
See application file for complete search history.

(56) References Cited

U.S. PATENT DOCUMENTS

| | | | |
|---|---|---|---|
| 4,225,109 A | 9/1980 | Yotsutsuji et al. | |
| 5,454,703 A * | 10/1995 | Bishop | B29C 67/205 249/111 |
| 2010/0193985 A1 | 8/2010 | Umeda et al. | |

FOREIGN PATENT DOCUMENTS

| | | |
|---|---|---|
| DE | 102009053517 A1 | 6/2010 |
| DE | 202012100504 U1 | 7/2013 |
| EP | 2227366 A1 | 9/2010 |
| FR | 2581585 A1 | 11/1986 |
| JP | 3874708 B2 * | 1/2007 |

(Continued)

OTHER PUBLICATIONS

French Search Report issued in corresponding application No. FR2209768, dated Apr. 21, 2023.

(Continued)

*Primary Examiner* — Jacob T Minskey
*Assistant Examiner* — Virak Nguon
(74) *Attorney, Agent, or Firm* — Maschoff Brennan

(57) ABSTRACT

The invention relates to a chamber for steam moulding expanded or cellular materials or foams comprising an enclosure comprising at least two parts (3a, 3b), at least one part being movable to allow it to be opened and closed, and the surfaces of which are partially covered with an insulating coating, in particular the inner surface of the enclosure or the outer surface of the steam inlets.

12 Claims, 5 Drawing Sheets

(56) References Cited

FOREIGN PATENT DOCUMENTS

WO            03/011550 A2     2/2003
WO    WO-2010083769 A1 *   7/2010   .......... B29C 33/048

OTHER PUBLICATIONS

French Search Report dated Jan. 17, 2024 as received in Application No. 2303342.
Extended European Search Report dated Jan. 23, 2024 as received in Application No. 23199768.5.

* cited by examiner

[FIG. 1]
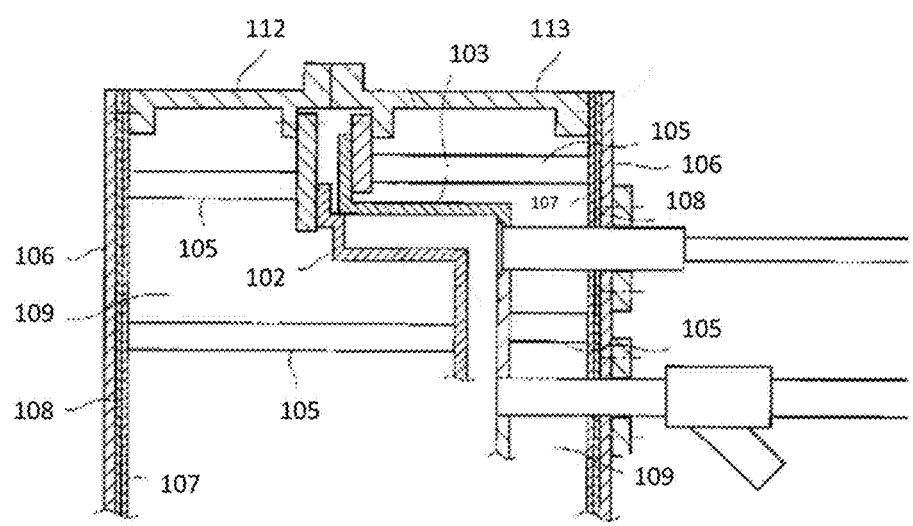

[FIG. 2]
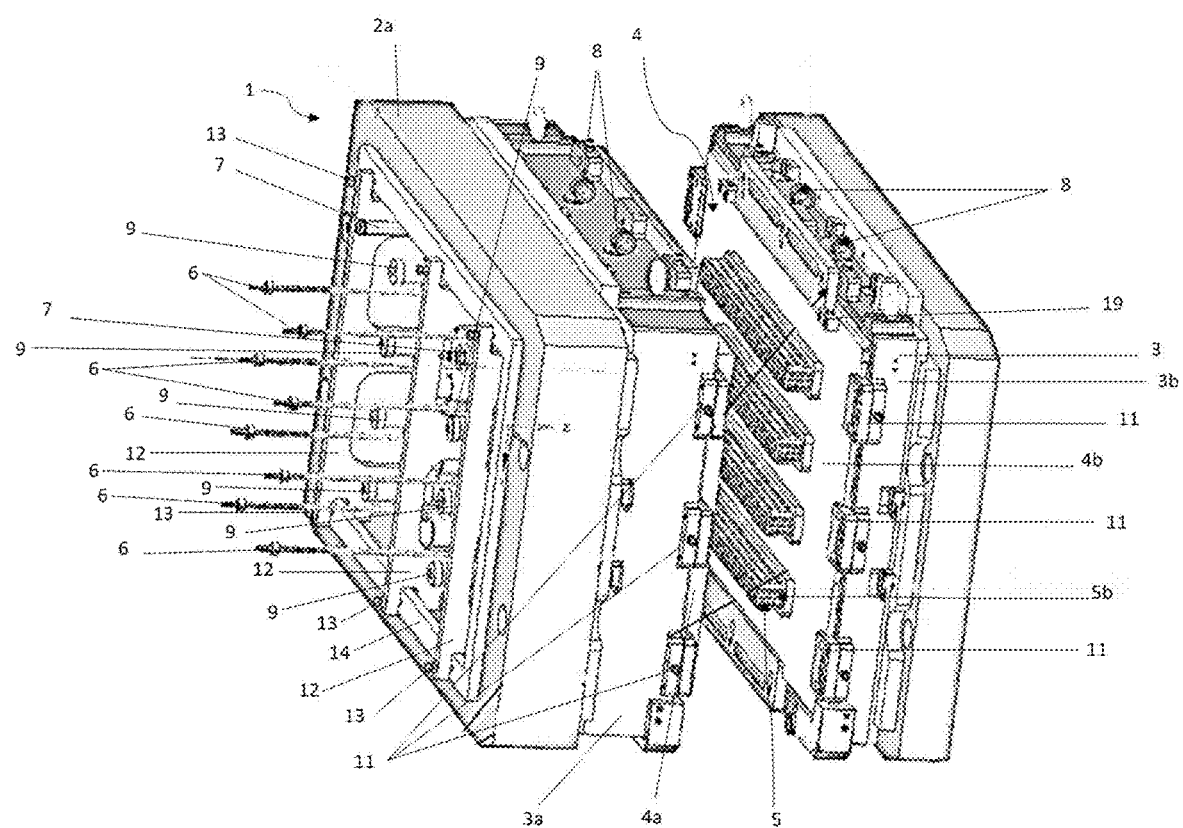

[FIG. 3]
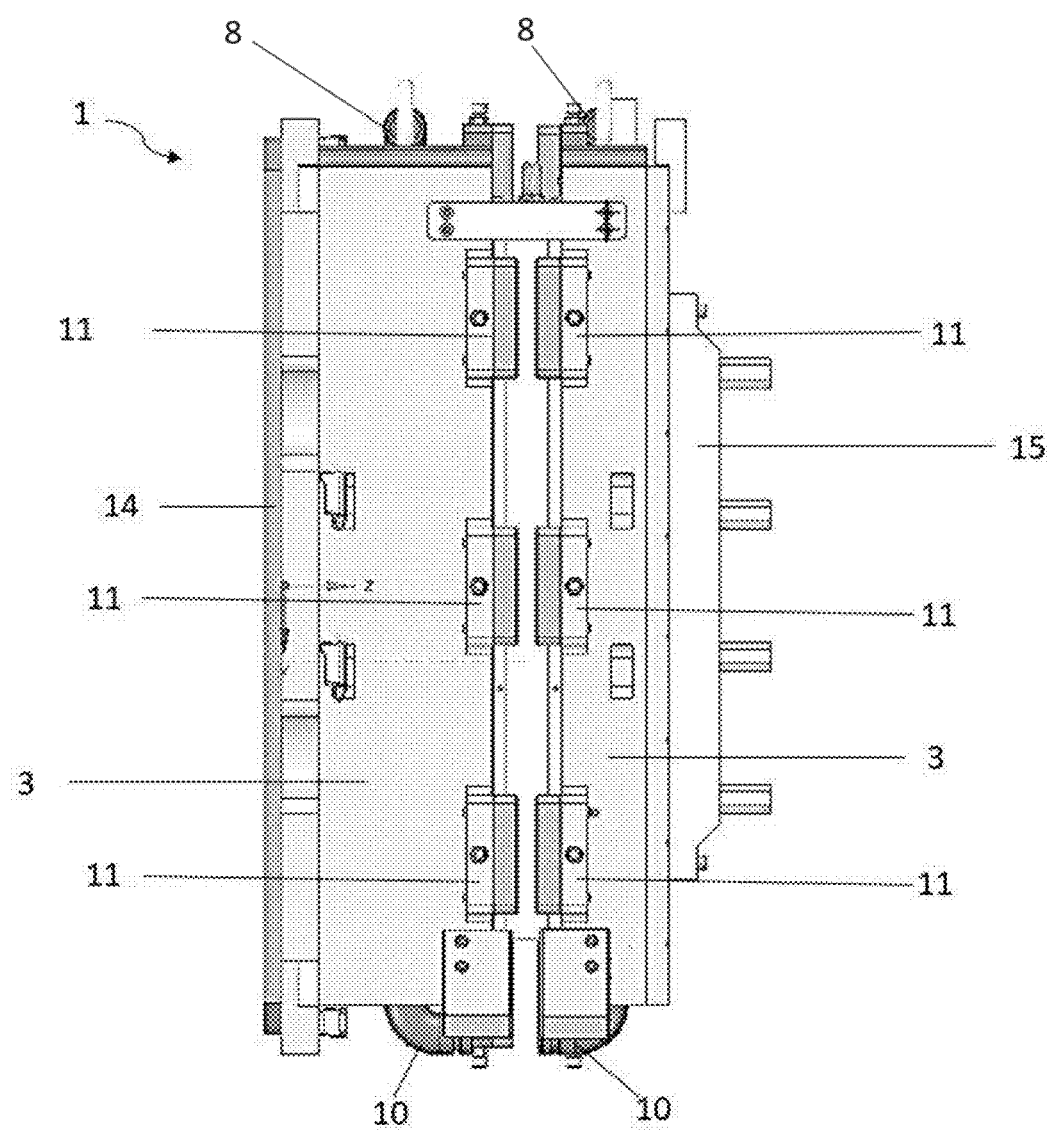

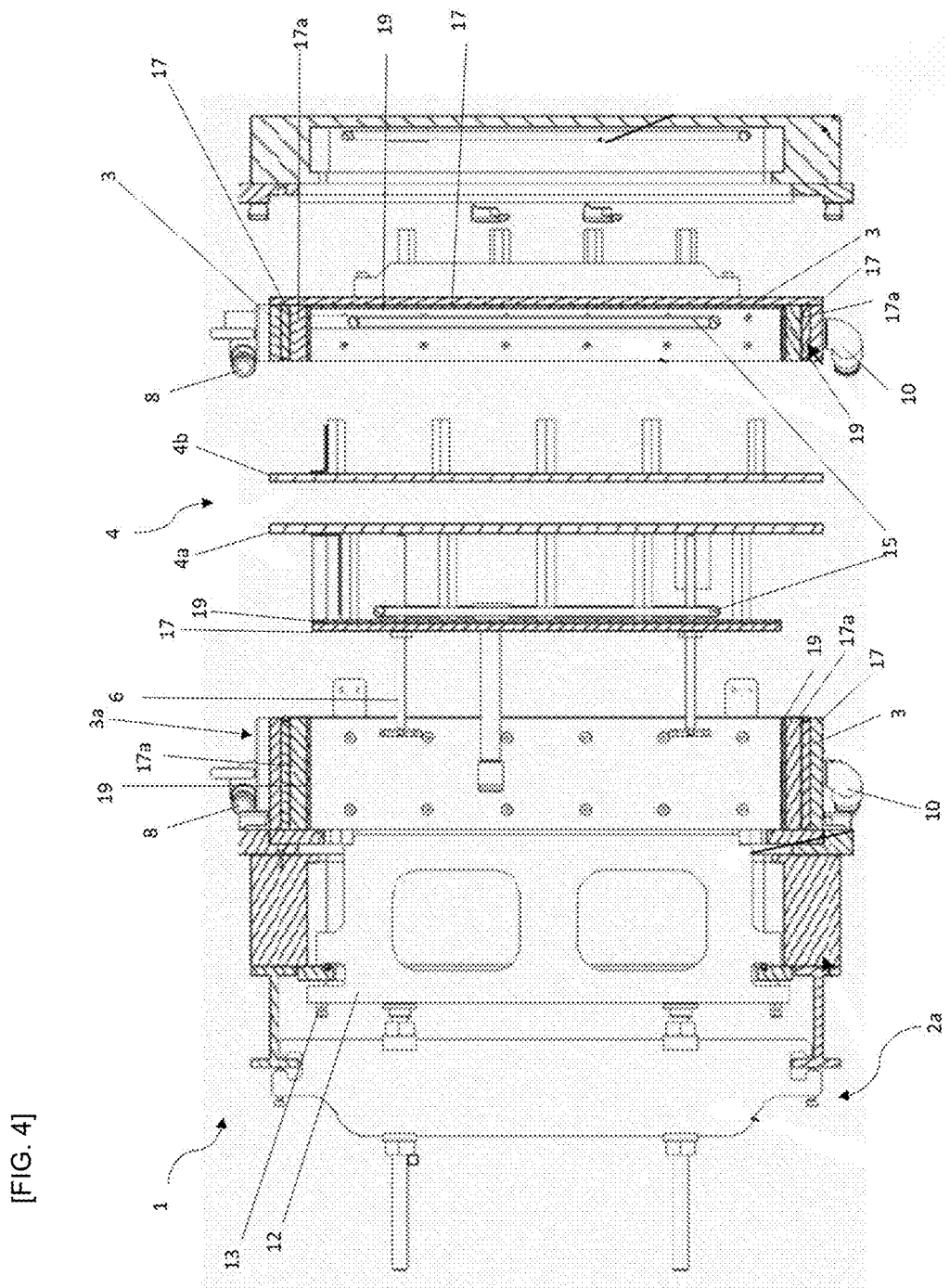

[FIG. 5]
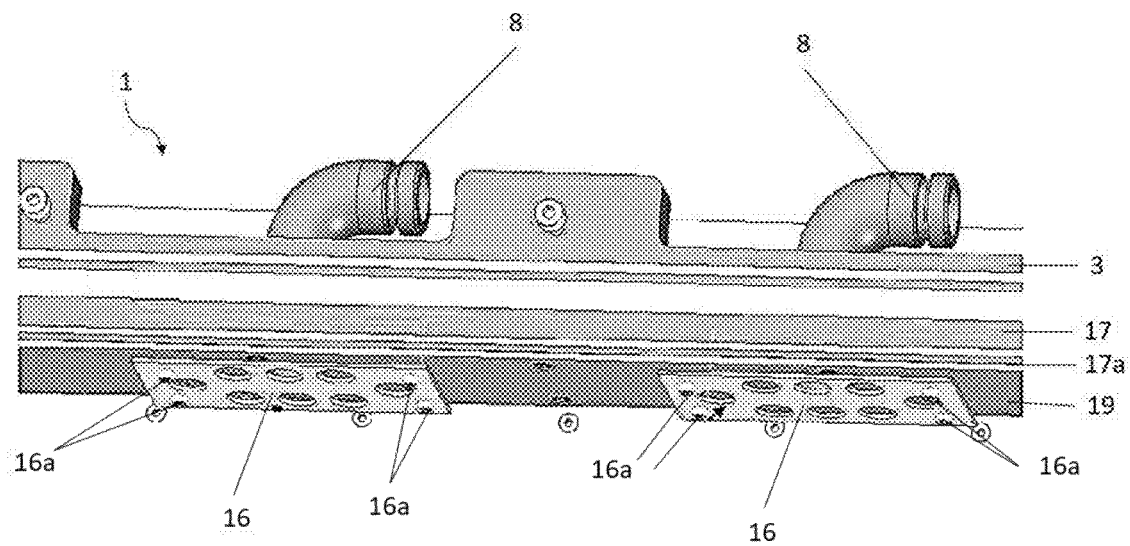
[FIG. 6]
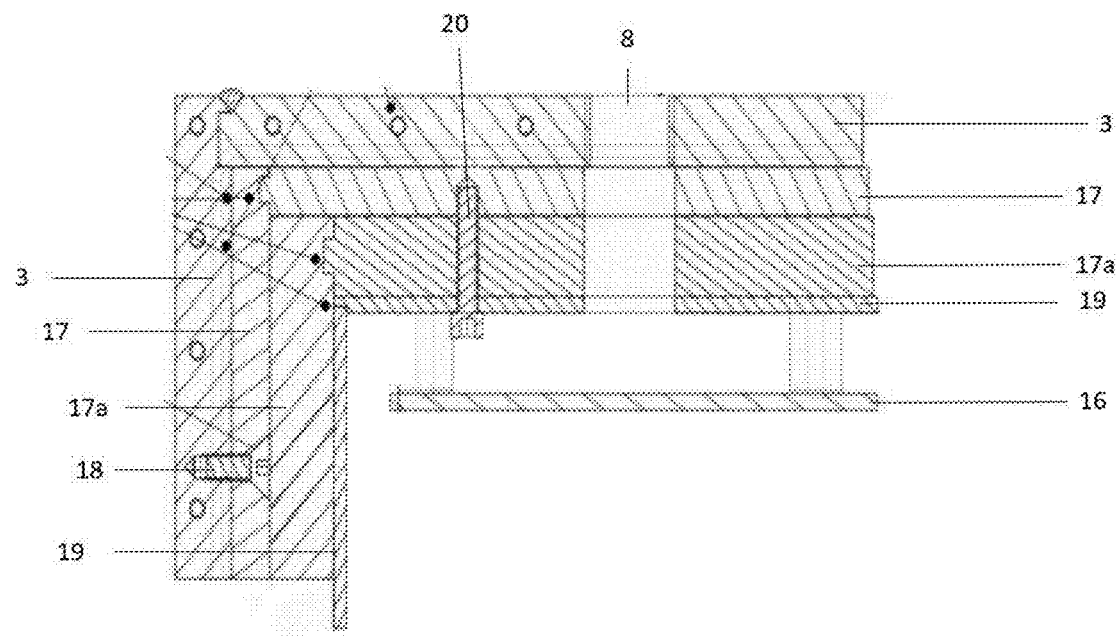

CHAMBER FOR STEAM MOULDING OF EXPANDED OR CELLULAR MATERIALS OR FOAMS

FIELD OF THE INVENTION

The invention relates generally to steam moulding of expanded or cellular materials or foams.

BACKGROUND OF THE TECHNIQUE

Traditionally, aluminium moulds are used to make moulded parts from expanded or cellular foams, such as expanded polystyrene. These moulds are inserted into aluminium or steel steam chambers, which are subjected to multiple temperature variations during operation. In particular, once the alveolar beads or pearls have been injected into the cavities of a mould, steam is injected to heat and possibly expand the beads contained in the mould to obtain a body with the shape given by the cavities. The cavities are microperforated to allow steam to penetrate to the core of the material. The mould is then cooled to stabilise the moulded body before it is removed by opening the mould. Each cycle can last from a few tens of seconds to a few minutes and the temperature is alternately raised, for example when moulding expanded polystyrene, to 110-120° C. by injecting pressurised steam into the chamber and mould, and then reduced to 80° C. by decompression and/or water spray to set the part. However, these incessant temperature variations cause significant energy dispersal in the moulding device and the steam chamber, which is generally made of steel or aluminium, partly because of the large mass of metal present in the tool (several hundred kilograms of steel and aluminium), and also because of the large volume of steam circulating in the chamber. In the end, less than 10% of the energy input is used to mould the cellular material.

Some manufacturers have sought to reduce energy loss by insulating the chamber and/or the moulds. However, this approach leads to the formation of condensation in the mould, which is detrimental to the quality of the final product, as it can cause filling defects in subsequent cycles, leading to defects in subsequent parts due to a lack of filling in the mould. For example, a film of water may appear on the cavities, preventing air from escaping correctly when material is inserted into the cavity during the next cycle, thus creating micro-pockets of air that prevent the cellular beads from setting correctly in the cavity. The result is misshapen parts and/or parts of non-uniform density.

Such moulds for manufacturing steam-moulded products are described, for example, in JP3874708. The steam chamber 109 and the mould inside which the cavities are placed, as described in this document and shown here in FIG. 1, comprise in particular a water-resistant protective material 107, in this case a layer of stainless steel, and a compression-resistant thermal insulation material 108, in this case a layer of asbestos, fixed against the rear plates 106 of the steam chamber 109, said plates being held at a distance between the two complementary parts of the mould 102 and 103 by supports 105. The water-resistant material layer 107 helps to protect the insulation layer from moisture by repelling it thanks to its hydrophobic properties. The surface of this layer must be smooth to allow condensation to drain efficiently. It is vital that the insulating layer 108 is resistant to compression, as it supports the mould and therefore the cavities, and ensures the correct shape of the expanded product. The material layers 107 and 108 are bolted between the rear plate and the edge of the side plates 112 and 113. These side plates are not insulated by materials 107 and 108.

Such a mould allows reducing the amount of steam required to heat and expand the material. One disadvantage of this type of mould is that it does not allow steam condensation inside the mould to be controlled. In fact, the presence of condensation can lead to filling defects in subsequent products.

There are other disadvantages related to condensation. When ejecting the moulded part, two types of ejector are known to be used: mechanical ejector and/or air injection. When air is sent through the steam orifices to eject the moulded part, water droplets will also be projected onto the parts. This moisture will pose a preservation problem when the parts are stored in plastic bags, for example. These parts must therefore undergo additional drying stages before they can be stored. In addition, cellular beads such as polystyrene absorb moisture, leading to weight variations of up to 10%. This is highly detrimental to the quality of the product, which generally has to meet precise moisture content criteria. It is therefore important to generate as little water as possible in the moulded part to avoid weighing it down.

It was suggested that the condensation be drained off using a drainage pump. This is described, for example, in EP2227366, where the steam condensate formed in the chamber is drawn off by suction. The disadvantage of this mould is that it requires additional energy to operate, which adds to the cost of the final product.

It was therefore deemed necessary by the applicant to improve steam injection moulding systems, seeking to avoid the formation of condensation in the first place.

SUMMARY OF THE INVENTION

To this end, the invention relates to a chamber for steam expansion moulding of expanded or cellular materials or foams comprising:
an enclosure comprising at least two parts, at least one part being movable to enable it to be opened and closed, and the inner surface of which is at least partly covered with (thermal) insulation, characterised in that a plate of thermally conductive material covers the insulation.

It has been found that the internal insulation of a steam chamber leads to the formation of condensation inside the chamber. Surprisingly, the applicant has identified that covering the thermal insulation with a sheet of thermally conductive material alleviates this problem by preventing condensation from forming.

The thermally conductive material preferably comprises metal, and may be pure metal or a composite. The metal is preferably aluminium, copper and/or stainless steel. Preferably, the plate of thermally conductive material (19) comprises aluminium, copper and/or stainless steel. In one particular embodiment, the plate is made of aluminium, copper and/or stainless steel.

The presence of this plate helps to limit temperature variations on the internal surface of the enclosure. Thus, not only is it no longer necessary to heat several hundred kilograms of metal (the chamber frame) thanks to the insulating layer, but, during the cooling stage, the internal plate of conductive material maintains a sufficiently high temperature during the mould cooling phase to prevent condensation of the steam in the next cycle. Not only does this result in considerable energy savings, but also eliminates the need for a condensation drainage system.

In addition, it helps to reduce cycle times while also optimising the steam moulding process, with energy and cost savings that are far superior to existing systems. It also helps to reduce the carbon footprint of the steam moulding process for expanded or cellular materials or foams.

The chamber for steam moulding expanded or cellular materials or foams can refer either to a traditional chamber inside which a mould with perforated cavities is placed, or to a chamber with a so-called "monobloc" mould with perforated cavities, i.e. a chamber whose walls (of the enclosure) are flush with the mould, or to a hybrid system. In all cases, the enclosure comprises a mould with at least one perforated cavity.

The perforated cavity is the component used to obtain the desired part shape. Preferably, the cavity consists of a punch part and a die part which, when combined, define the shape of the part to be moulded. The inside of the cavities is designed to be in contact with expanded or cellular materials or foams. The perforations in the cavity are dimensioned to be smaller than the beads of the cellular material, but large enough to allow the passage of steam through these beads.

The enclosure and the mould may be two separate parts or the mould may, at least in part, be merged with the enclosure.

The enclosure refers to a volume bounded by a rigid envelope, defined for example by a frame and walls. The enclosure preferably has a rectangular parallelepiped shape. In one particular embodiment, the enclosure is a cube.

The enclosure comprises at least two parts, at least one of which is movable such that it can be opened and closed. Generally, a fixed part cooperates with the moving part during operation to ensure the stability of the system.

Each part of the enclosure is connected with a part of the mould. A part of the mould supports a punch part of the cavity composed of a raised texture. The other part of the mould supports the die part of the perforated cavity, arranged to be complementary to the punch when the enclosure is closed. Thus, opening the enclosure allows the mould and cavities to be opened for ejection of the parts that were moulded when the enclosure was closed, in the conventional way well known to a skilled person.

The enclosure comprises fluid connection systems between the inside of the enclosure and the outside of the enclosure, preferably arranged on the sides of the enclosure, such as at least one water inlet, at least one steam inlet and at least one cellular bead injector. These connection systems allow the various materials to be fed directly into the enclosure when it is closed. Preferably, the enclosure also comprises at least one duct for applying a vacuum.

Preferably, the water inlet is located on one side of the enclosure. It is connected to a water source and enables water to be pushed inside the enclosure, preferably in the form of a spray directed towards at least one cavity. The water supply contributes to the cooling system to cool the inside of the mould cavity to set the moulded part before the vacuum stabilisation stage to remove residual water and steam before the part is ejected. The water inlet is designed to operate discontinuously and is well known to a skilled person.

Preferably, the cellular bead injector is positioned on a side of the enclosure to insert cellular beads into at least one perforated cavity of the mould. The bead injector is designed to operate discontinuously and is well known to a skilled person.

Preferably, the steam inlet is positioned on a side of the enclosure to allow steam to be inserted into the enclosure, preferably towards at least one cavity. The steam feed pipe opens into the enclosure at a steam inlet. In some cases, the steam inlet can also function as an air inlet, to help eject the part from the cavity when it is opened.

Preferably, at least one steam deflector is installed in the enclosure opposite the steam inlet to ensure faster dispersion of the steam in the enclosure. The deflector is positioned, for example, a few centimetres from the steam inlet, preferably no more than 10 mm from it, preferably 5 mm.

Preferably, the enclosure comprises a frame to ensure its rigidity. For example, the frame may be made of aluminium, or any other material that ensures rigidity. The frame may also include reinforcements.

The walls of the enclosure can be made of the same material as the frame, or of another material.

Advantageously, the thickness of the enclosure can be between 10 and 40 mm, preferably between 20 and 30 mm.

In operational mode, the enclosure can have two positions, an open position and a closed position.

Advantageously, closure means are provided to keep the enclosure sealed during successive injections of beads into the cavities, and of steam and water towards the cavities.

The chamber of the invention is characterised by the fact that the inner surface of the enclosure is at least partially covered by a layer of insulation. Preferably, at least 50% of the enclosure is covered by a layer of insulation, preferably at least 70% by a layer of insulation, more preferably at least 90% by a layer of insulation and even more preferably entirely.

If the insulation is a relatively rigid material, the insulation layer can be joined to the inside of the enclosure using a mortise and tenon system at the corners to prevent steam from coming into contact with the edges and/or corners of the frame, and thus prevent condensation forming.

Advantageously, an insulation layer refers broadly to one or more superimposed insulation layers, possibly of different types. This makes it possible to increase and/or combine the thermal properties of the insulation.

An insulator can be a flexible or rigid material, possibly expanded, foamed or cellular, such as those commonly used in other insulation applications (mineral wool, polystyrene, polyurethane, epoxy resin or glass, etc.), and/or an insulating coating, and/or textile materials such as non-woven fabrics. The insulation can have a total thickness of between 1 and 45 mm, depending on the type of insulation used. For example, in the case of a foamed or cellular expanded material, the thickness can be between 15 and 45 mm, preferably between 20 and 30 mm. In the case of an insulating coating, the thickness required is generally less to obtain a comparable thermal conductivity, for example between 1 mm and 10 mm, preferably between 1.5 mm and 5 mm.

The insulation is chosen according to technical criteria such as good thermal and mechanical resistance, a low expansion coefficient and good stability with respect to heat and humidity over the period of use.

Insulation such as foamed or cellular expanded material preferably has a density of between 1.70 and 2 g/cm 3.

An insulating coating, in this case thermal insulation, preferably refers to a fluid or semi-fluid material which can be spread, for example using a paint brush or roller, or sprayed (using a spray gun), to obtain an insulating layer after drying with a thickness ranging from a few microns to a few millimetres. Multiple coats can be applied one on top of the other, with a drying time between applications.

Preferably, the thermal insulation coating comprises particles of insulating material, preferably mineral particles such as ceramic or glass. Examples include micro-bubble insulating microspheres, hollow glass microspheres, for example made of borosilicate, hollow ceramic micro-bodies, etc.

These particles are suspended in an aqueous polymer base which may contain formaldehyde, (methyl)acrylate, styrene, etc.

For example, a layer of insulating coating is between 0.3 and 0.7 mm thick. Advantageously, several layers, for example between 2 and 8 layers, for example 5 layers, can be applied to obtain a thickness of between 1 mm and 5 mm, for example between 2 mm and 3 mm.

The insulating coating is preferably applied to the inner surface of the enclosure and is covered by a plate of thermally conductive material.

The insulating coating can be applied to the inner surface of the enclosure and/or to the plate of thermally conductive material.

The insulating coating is preferably applied to the plates made of thermally conductive material (aluminium or stainless steel), which are then applied to the inside of the enclosure using high-temperature silicone and/or screwed in place.

The insulation preferably has a thermal conductivity of between 0.001 and 0.40 W/mK, 0.01 and 0.40 W/mK, 0.05 and 0.40 W/mK, preferably between 0.10 and 0.35 W/mK.

The insulation preferably has a thermal resistance of between 150 and 250° C.

In some cases, the insulation can have a compressive strength of between 400 and 550 MPa.

In some cases, the insulation can have a flexural strength of between 350 and 450 MPa.

The insulator can have a dielectric strength of between 10 and kV/mm.

A plate of thermally conductive material covers the insulating layer. The thermally conductive material preferably has a thermal conductivity of between 230 and 400 W/m·K.

Preferably, the plate of thermally conductive material comprises aluminium and/or stainless steel. Preferably, the plate of thermally conductive material is made of aluminium, stainless steel or copper.

The sheet of thermally conductive material preferably has a thermal conductivity coefficient of between 200 and 400 $W·m^{-1}K^{-1}$, preferably between 220 and 395 $W·m^{-1}K^{-1}$, and more preferably between 230 and 300 $W·m^{-1}K^{-1}$.

The plate of thermally conductive material preferably has a low coefficient of linear expansion, i.e. the coefficient of linear expansion from 20 to 100° C. is between $15×10^{-6}$ and $30×10^{-6}$. Preferably, the plate of thermally conductive material covers at least 70% of the insulating layer, preferably 80%, more preferably 90%, most preferably the entire insulating layer.

Preferably, the thickness of the plate of thermally conductive material is between 1 and 5 mm, more preferably between 1 and 3 mm. This helps to provide sufficient rigidity for its integration into the enclosure and gives it good durability, without unduly weighing down the device and the metal mass to be heated.

The plate of conductive material can advantageously be mechanically reinforced with a layer of organic composite such as Bakelite and Frathernit.

The plate of conductive material is fixed to the layer of insulation using a fastener that provides sufficient mechanical strength, such as a stainless steel screw.

The expanded or cellular material or foam moulded in the steam chamber of the invention may, for example, be polystyrene, polypropylene, polyethylene and/or polystyrene/polyethylene.

The applicant was surprised by the effectiveness of the insulating coating in reducing steam consumption in the moulding process. As is coating is so easy to install, she decided to insulate other parts of the equipment.

The invention therefore also extends, more generally, to the use of a thermal insulating coating to insulate, at least in part, a device for steam moulding expanded or cellular materials or foams.

Advantageously, the insulating coating can be applied to the frame of the moulding enclosure, inside and/or outside the steam chambers, whether fixed or mobile, and/or to the outer surface of the steam passage areas or ducts.

Preferably, the insulating coating is not in contact with steam. When applied to internal areas of the chamber, it is preferably covered in a watertight manner by a protective layer.

The invention also relates to a chamber for steam moulding expanded or cellular materials or foams comprising an enclosure comprising at least two parts, at least one part being movable to allow it to be opened and closed, the enclosure comprising at least one steam inlet and at least one injector of cellular beads, characterised in that the surfaces of the enclosure and/or the steam inlet are at least partly covered by a thermal insulating coating.

Preferably, at least 50% of the outer surface of the steam inlets is covered by insulating material, more preferably at least 70%, most preferably at least 90%.

Preferably, at least 50% of the inner surface of the enclosure is covered by insulating material, more preferably at least 70%, most preferably at least 90%.

The insulating coating, particularly when applied to the inner surface of the enclosure, is arranged so that it is not in direct contact with the steam. This implies it can be covered with a waterproof protective layer. For example, this could be a polymeric layer, a hydrophobic paint, a plate made of plastic or another suitable material, or the plate made of a conductive material. Watertight seals can be added, particularly when rigid materials are used, to seal the contours and prevent any steam infiltration.

Preferably, the insulating coating is between 1 and 5 mm thick, more preferably between 2 and 4 mm.

The invention will be better understood with the aid of the description of several embodiments, corresponding to the drawing in which:

FIG. 1 shows a steam chamber according to the prior art (JP3874708).

FIG. 2 shows a perspective view of a first embodiment of a chamber for steam moulding expanded or cellular materials or foams in an open configuration according to the invention.

FIG. 3 shows a side view of the chamber shown in FIG. 2 in its closed configuration.

FIG. 4 is a cross-sectional exploded view of the steam chamber shown in FIG. 2 in its open configuration.

FIG. 5 is a perspective view of a steam deflector according to the invention installed in the chamber shown in FIG. 2.

FIG. 6 is a schematic cross-sectional view of an arrangement of the various layers of the enclosure shown in FIG. 2.

The features, variants and different embodiments of the invention may be combined with one another in various combinations, insofar as they are not incompatible or mutually exclusive. In particular, it is possible to imagine variants of the invention comprising only a selection of features sufficient to confer a technical advantage and/or to differentiate the invention from the prior art.

With reference to FIGS. 2 to 6, a chamber 1 for steam moulding expanded or cellular materials or foams comprises an enclosure 3 with at least two distinct parts, 3a and 3b. Part 3a is mobile while part 3b is fixed, to enable the enclosure 3 to be opened and closed. The fixed part 3b interlocks with the moving part 3a during operation to enable the moulded part to be produced.

In this non-limiting example, the enclosure 3 comprises a mould 4 with perforated cavities 5; here, four cavities 5 are shown. The mould 4 consists of a casing whose role is to hold the perforated cavities 5 used to obtain the desired part shape.

The mould 4 is in two distinct parts with one part 4a connected to part 3a of the enclosure and another part 4b connected to part 3b of the enclosure.

Part 4a of mould 4 supports a punch part of cavity 5. The other part 4b of the mould supports the die part 5b of the perforated cavity 5. When the enclosure is closed, the two parts 5a and 5b of the cavities are connected so as to delimit the volume of the part to be moulded.

The inside of the cavities 5 is designed to be in contact with expanded or cellular materials or foams. In this case, the cavities are made of aluminium. They are perforated. The perforations in the cavities are dimensioned to be smaller than the beads of the cellular material, but large enough to allow the passage of steam into the cavity, through these beads.

The mould 4 includes an ejection system 6 for the moulded part. The ejection system here comprises eight ejectors 6, which pass through the large side of the movable part 3a of the enclosure and emerge inside the cavities 5. When the ejectors 6 are activated, when the mould 4 is open, they exert pressure on the moulded part to detach it.

Enclosure 3 comprises a rigid frame and sides, on which are arranged fluid connection systems between the interior of the enclosure and the exterior of the enclosure.

In particular, there is a water inlet 7, in this case two water inlets, passing through the large side of the movable part 3a of the enclosure and intended to conduct liquid water to sprays installed in the enclosure, directed towards the cavities 5. This water is used to cool the cavities 5 to set the material after baking. The water inlet 7 helps to cool the mould cavity 4. The water inlet 7 is designed to operate discontinuously and is well known to a skilled person.

Steam inlets 8, in this case four steam inlets, are also located opposite each other on the two opposite parts of the enclosure 3a and 3b, at the top of the enclosure. They are designed to allow steam to penetrate the enclosure 3 and the mould 4 such that it passes through the cavities 5 for welding the cellular material.

Here too, as is generally the case, the steam inlets 8 can also function as air inlets, to help eject the part from the cavity when it is opened.

The cellular beads injectors 9, in this case eight injectors, pass through the large side of the movable part 3a of the enclosure and emerge inside the perforated cavities 5 of the mould 4 (not shown).

The bead injector 9 is designed to operate discontinuously and is well known to a skilled person.

Valves (not shown) are used to open and close these various injectors at the appropriate moments in the moulding cycle.

The expanded or cellular material or foam introduced into the cavities via the injectors 9 can be polystyrene, polypropylene, polyethylene and/or polystyrene/polyethylene, for example.

Enclosure 3 also includes at least one line for applying vacuum to extract the air and gas still present in the mould after the water-cooling phase. Preferably, the vacuum application line is connected to a vacuum pump located close to chamber 1. This equipment is well known to a skilled person.

The enclosure 3 comprises locking means 11 designed to keep the enclosure 3 sealed during successive injections of beads into the cavities 5, and of steam and water towards the cavities 5. These locking means 11 can be two-part fasteners placed opposite each other around the perimeter of the enclosure parts 3a and 3b. They interlock with each other when chamber 1 is closed. Here, twelve fasteners (three per side of the enclosure) are fixed to the side parts 3a and 3b of the enclosure. The number and/or type of fasteners may depend on the dimensions of the chamber.

The enclosure 3 comprises reinforcements such as, for example, stiffeners 12 placed along the lateral side of part 3a of the enclosure. The ends of the stiffeners are fixed by screws 13 to the rear frame 14 of part 2a of the additional chamber. These screws 13 can be, for example, of type FH M12×60 mm.

Part 3b of the enclosure includes a sprinkler circuit 15 at the rear to regulate the temperature of the mould 4.

Steam deflectors 16 are installed in the enclosure 3 opposite the steam inlet to ensure faster dispersion of steam in the enclosure (FIG. 5). The deflector 16 is fixed, for example, to the plate a few centimetres from the steam inlet 8 using screws 16a.

An insulation layer 17, here for example a rigid layer of epoxy resin, is placed on the inside faces of the enclosure 3 (FIG. 4), in particular on the side faces (on which the enclosure opens) as well as on the large faces. Conductive metal plates 19 cover the insulation.

The insulating layer 17 comprises two layers 17 and 17a. It is assembled inside the enclosure 3 using a mortise and tenon system at the corners (FIG. 6) to prevent the steam from coming into contact with the edges and/or corners of the frame, thereby preventing the formation of condensation.

The insulation layer 17, 17a is positioned and fixed to the four sides of the frame of the enclosure 3, for example using screws 18.

The two-layer composition of the insulation makes it possible to increase and/or combine the thermal properties of the insulation. In FIG. 5, an additional insulation layer 17a covers the insulation layer 17.

Insulation 17, 17a can have a total thickness of between 15 and 45 mm. It is possible to have different thicknesses between 17 and 17a. It is also possible to combine more than two layers.

Insulators 17 and 17a are chosen according to technical criteria such as good thermal and mechanical resistance, a low expansion coefficient and good stability with respect to heat and humidity over the period of use. For example, an insulator could be an epoxy resin.

Examples of optimal ranges for the mechanical properties of insulation are described in Table 1 below:

TABLE 1

| Technical criteria | Test method | Value range |
|---|---|---|
| Density (in $g/cm^3$) | ISO 1183 | 1.70-2 |
| Thermal conductivity (in W/mK) | ISO 8302 | 0.20-0.40 |
| Thermal resistance (in | IEC 216 | 150-250 |

TABLE 1-continued

| Technical criteria | Test method | Value range |
|---|---|---|
| ° C.) | | |
| Compressive strength (in MPa) | ISO 604 | 400-550 |
| Flexural strength (in MPa) | ISO 178 | 350-450 |
| Dielectric strength (in kV/mm) | IEC 243-1 | 10-20 |

A non-limiting example of insulation suitable for this invention is the one sold under the trade name Deltherm 68.890 by BASFF Thermal Engineering SRL or EPGM 203 sold by Melpro SAS.

The plate of thermally conductive material 19 covering it is in this case made of aluminium, a material chosen for its properties as well as its affordability. However, other materials can also be used, such as stainless steel, copper, alloys or composites.

The characteristics of copper, stainless steel and aluminium are detailed in table 2 below:

TABLE 2

| | Aluminium | Stainless steel | Copper |
|---|---|---|---|
| Thermal conductivity (W-m$^{-1}$-K$^{-1}$) | 237 | 15-20 | 390 |
| Coefficient of linear expansion from 20° to 100° C. | $15 \times 10^{-6}$ | $16.5 \times 10^{-6}$ | $30 \times 10^{-6}$ |
| Density (in g/cm$^3$) | 2.7 | 7.8-7.9 | 8.96 |
| Melting point (in ° C.) | 660.3 | | 1085 |
| Poisson's ratio | 0.24 to 0.33 | | 0.33 |
| Young's modulus (in GPa) | 69 | 200 | 124 |
| Specific heat (in J·k$^{-1}$·kg$^{-1}$) | 897 | 500 | 385 |

The thermally conductive material 19 preferably has a thermal conductivity of between 230 and 450 W-m$^{-1}$-K$^{-1}$. The thermal conductivity of a material is a physical quantity that characterises its ability to diffuse heat in media without any macroscopic displacement of matter. Aluminium and copper therefore have good conductivity.

The plate of thermally conductive material 19 preferably has a low coefficient of linear expansion, i.e. a coefficient of linear expansion from 20 to 100° C. between $15 \times 10^{-6}$ and $30 \times 10^{-6}$.

The plate of thermally conductive material 19 covers almost the entire surface of the insulator, which itself covers almost the entire inside wall of the enclosure. Although less cover would probably be less effective, it would still be more profitable than not having any. The conductive material therefore preferably covers at least 70% of the insulating layer 17 or 17a, more preferably 80%, even more preferably 90%, and most preferably the entire insulating layer 17 or 17a.

Preferably, the thickness of the plate of thermally conductive material 19 is 5 mm here. This helps to provide sufficient rigidity for its integration into the enclosure 3 and gives it good durability, without unduly weighing down the device and the metal mass to be heated.

The plates 19 are fixed to the insulation 17, 17a using screws 20, in this case made of stainless steel to withstand the damp conditions expected inside the enclosure, and do not interfere in any way with the properties of the plate 19.

A non-limiting example of a plate of thermally conductive material 19 suitable for this invention is the one sold under the trade name AG 3C 5083 by Eyrolliage®.

The characteristics of the AG 3C 5083 plate are described in Table 3 below:

TABLE 3

| | AG 3C 5083 plate |
|---|---|
| Modulus of elasticity (MPa) | 71000 |
| Modulus of rigidity (MPa) | 26800 |
| Poisson's ratio (v) | 0.33 |
| Solidity temperature (in ° C.) | 580 |
| Melting point (° C.) | 640 |
| Specific heat (in J kg-1 K-1) | 899 |
| Coefficient of thermal expansion (in μm m-1 K-1) | 23.8 |
| Density (in kg m-3) | 2660 |
| Resistivity (in nΩm) | 60 |
| Thermal conductivity (in λ) | 117 |
| Electrical conductivity (in % IACS) | 28.5 |

FIGS. 2 to 6 illustrate a specific embodiment of the chamber of the invention. A person skilled in the art will be familiar with the operating principle of such chambers and the technical variations that can be made to them, depending on the type of cellular material used, the size and shape of the parts to be moulded, etc.

The innovation here lies in the insulating layer 17 combined with a plate of thermally conductive material 19.

During a parts moulding process, the enclosure is initially closed, cellular foam beads are injected into the cavities 5, steam is then injected into the enclosure 3 and the mould 4 so as to penetrate the cavities 5 to weld the cellular beads. Liquid water is then sprayed onto the cavities to set the moulded parts. A vacuum stage extracts residual moisture and accelerates stabilisation of the moulded part. The enclosure 3 is then opened, the part ejectors 6 activated and/or a stream of air is applied to eject the parts. The enclosure 3 is then closed again for a new cycle.

Thanks to the combination of insulation and plates of conductive material 19, energy loss from the process is considerably reduced. Only the plates of conductive material 19 are subject to temperature variations during each cycle, which represents a much smaller volume of material than the frame and walls of the enclosure. In addition, the temperature of the plates of conductive material 19 does not drop considerably during the cooling phase of the part, thus preventing the moisture introduced into the chamber (steam, water spray) from condensing on these walls and in the chamber in general, thereby avoiding manufacturing defects due to condensation.

The invention has also been implemented in another way, by replacing the insulating plates 17 and 17a with an insulating coating.

The thermal insulation coating is in this case a white hydrophobic paint comprising a mixture of styrene and acrylic polymers (formaldehyde, methyl acrylate and styrene) in an aqueous base, fire inhibitors and retardants and closed-cell microgranular ceramic additives with a thermal conductivity of around 1 mW/m. ° C. per layer. It was applied by brush in several coats (typically 5 coats of 0.5 mm) until a coat of 2-3 mm was obtained on the inner surface of the enclosure (instead of insulation 17 and 17a) and covered with a conductive aluminium plate (2.5 mm thick). A watertight seal, in this case an acetic silicone seal for high-temperature applications, is applied around the perimeter to prevent any contact between the process steam and the paint.

Paint was also applied by brush at a thickness of 1.5 to 5 mm to the external, visible parts of the machine, in which steam circulates.

A standard production cycle was carried out. It was found that the temperature recorded on the outside of the enclosure was 50% lower than the temperature recorded for the same production run without paint (43.8° C. compared to 84.2° C. without insulation). Steam consumption is reduced by 39% compared to a cycle without insulation.

It is anticipated that by insulating the entire chamber, steam savings could reach 50%.

The paint could also have been applied using a spray gun.

To improve the adhesion of the paint to the various surfaces, the first coat can be diluted with water, for example to 50% by volume.

In a first aspect of the invention, a chamber for steam expansion moulding (1) of expanded or cellular materials or foams comprises an enclosure (3) comprising at least two parts (3a, 3b), at least one part being movable (3a) to allow it to be opened and closed, and the inner surface of which is at least partly covered with insulation (17), characterised in that a plate of thermally conductive material (19) covers the insulation (17).

In the chamber of the first aspect, the enclosure (3) may comprise a mould (4) with at least one perforated cavity (5). In the chamber of the first aspect, the enclosure (3) may comprise fluid connection systems between the inside and outside of the enclosure (3), the fluid connections being at least one water inlet (7), at least one steam inlet (8), and at least one cellular bead injector (9).

In the chamber of the first aspect, the inner surface of the enclosure (3) may be covered across at least 50% by the insulation (17), preferably at least 70%, more preferably at least 90%.

In the chamber of the first aspect, the insulation (17) can be assembled inside the enclosure (3) using a mortise and tenon system at the corners.

In the chamber of the first aspect, the insulation (17) may comprise one or more superimposed insulation layers (17a), possibly of different types.

In the chamber of the first aspect, the plate of thermally conductive material (19) comprises aluminium and/or copper.

In the chamber of the first aspect, the plate of thermally conductive material (19) can have a thermal conductivity coefficient of between 200 and 400 $W \cdot m^{-1} K^{-1}$.

In the chamber of the first aspect, the plate of thermally conductive material (19) may have a coefficient of linear expansion from 20 to 100° C. of between $15 \times 10^{-6}$ and $30 \times 10^{-6}$.

In the chamber of the first aspect, the plate of thermally conductive material (19) preferably covers at least 70% of the insulation (17).

In the chamber of the first aspect, the thickness of the plate of thermally conductive material (19) is between 2 and 7 mm. The various features proposed for the chamber of the first aspect may be combined and are not mutually exclusive.

In a second aspect of the invention, a chamber for steam moulding (1) of expanded or cellular materials or foams comprises an enclosure (3) comprising at least two parts (3a, 3b), at least one part being movable (3a) to allow it to be opened and closed, the enclosure (3) comprising at least one steam inlet (8), and at least one cellular bead injector (9), characterised in that the surfaces of the enclosure and/or the steam inlet are at least partly covered by a thermally insulating coating.

In the chamber of the second aspect, at least 50% of the outer surface of the steam inlets can be covered by the insulating coating, preferably at least 70%, more preferably at least 90%. In the chamber of the second aspect, at least 50% of the outer surface of the enclosure (3) can be covered by the insulating coating, preferably at least 70%, more preferably at least 90%. In the chamber of the second aspect, the insulating coating applied to the inner surface of the enclosure is arranged so as not to be in direct contact with the steam.

In the chamber of the second aspect, the insulating coating applied to the inner surface of the enclosure may be covered by a plate of thermally conductive material.

In the chamber of the second aspect, the plate of thermally conductive material (19) may comprise aluminium, stainless steel and/or copper.

In the chamber of the second aspect, the plate of thermally conductive material (19) can have a thermal conductivity coefficient of between 200 and 400 $W \cdot m^{-1} K^{-1}$.

In the chamber of the second aspect, the plate of thermally conductive material (19) may have a coefficient of linear expansion from 20 to 100° C. of between $15 \times 10^{-6}$ and $30 \times 10^{-6}$.

In the chamber of the second aspect, the thickness of the plate of thermally conductive material (19) may be between 2 and 7 mm.

In the chamber of the second aspect, the insulating coating may be between 1 and 5 mm thick, preferably between 2 and 4 mm.

In the chamber of the second aspect, the insulating coating may comprise mineral particles.

The various features proposed for the chamber of the second aspect may be combined and are not mutually exclusive.

The invention claimed is:

1. A method for manufacturing a chamber for steam moulding of expanded or cellular materials or foams having an enclosure comprising at least two parts, at least one part being movable to allow it to be opened and closed, the enclosure comprising a plate of thermally conductive material, at least one steam inlet, and at least one cellular bead injector, wherein a fluid or semi-fluid material is applied by spreading or by spraying on an inner surface of the enclosure and/or on the plate of thermally conductive material, to obtain after drying an insulating layer with a thickness ranging from a few microns to a few millimetres, and covering the insulating layer by covering the inner surface of the enclosure by the plate of thermally conductive material.

2. The method according to claim 1, wherein the fluid or semi-fluid material applied comprises mineral particles.

3. The method according to claim 1, wherein the mineral particles of the fluid or semi-fluid material applied comprise micro-bubble insulating microspheres, hollow glass microspheres, and/or hollow ceramic micro-bodies.

4. The method according to claim 1, wherein the fluid or semi-fluid material applied is a white hydrophobic paint comprising a mixture of styrene and acrylic polymers in an aqueous base, fire inhibitors and retardants and closed-cell microgranular ceramic additives with a thermal conductivity of around 1 mW/m·° C. per layer.

5. The method according to claim 1, wherein at least 50% of an outer surface of the at least one steam inlet is covered with the fluid or semi-fluid material.

6. The method according to claim 1, wherein at least 50% of the inner surface of the enclosure is covered with the fluid or semi-fluid material.

7. The method according to claim 1, wherein the plate of thermally conductive material comprises aluminium, stainless steel, and/or copper.

8. The method according to claim 1, wherein the plate of thermally conductive material has a thermal conductivity between 200 and 400 W·m−1 K−1.

9. The method according to claim 1, wherein the plate of thermally conductive material has a coefficient of linear expansion from 20 to 100° C. between 15×10−6 and 30×10−6.

10. The method according to claim 1, wherein the thickness of the plate of thermally conductive material is between 2 and 5 mm.

11. The method according to claim 1, wherein the obtained insulating layer has a thickness between 1 and 5 mm.

12. The method according to claim 1, wherein the fluid or semi-fluid material is applied on a frame of the enclosure of the chamber, inside the chamber, and/or to outer surfaces of steam passage areas or lines of the chamber.

\* \* \* \* \*